United States Patent [19]
Uesaka et al.

[11] Patent Number: 5,732,723
[45] Date of Patent: Mar. 31, 1998

[54] METHOD OF DUST REMOVING IN THE FORM OF AIR ASPIRATION AND APPARATUS THEREFOR

[75] Inventors: Satoshi Uesaka, Suzuka; Kouji Iwai, Tsu; Toshikazu Kakehashi, Suzuka, all of Japan

[73] Assignee: Honda Giken Kogyo Kabushiki Kaisha, Tokyo, Japan

[21] Appl. No.: 601,357

[22] Filed: Feb. 16, 1996

[30] Foreign Application Priority Data

Feb. 17, 1995 [JP] Japan ................. 7-029284

[51] Int. Cl.⁶ ............................. B08B 1/02; B08B 5/04
[52] U.S. Cl. .................. 134/6; 15/312.1; 15/319; 15/380; 134/21
[58] Field of Search ................. 15/308, 312.1, 15/319, 381, 380; 134/6, 21

[56] References Cited

U.S. PATENT DOCUMENTS

| | | | |
|---|---|---|---|
| 2,348,861 | 5/1944 | Smellie | 15/380 X |
| 3,013,292 | 12/1961 | McCormick et al. | 15/312.1 X |
| 3,754,299 | 8/1973 | Turner | 15/380 X |
| 4,430,768 | 2/1984 | Novinger | 15/381 |
| 4,563,788 | 1/1986 | Kobayashi | 15/312.1 |
| 4,972,544 | 11/1990 | Reid | 15/381 X |
| 5,405,450 | 4/1995 | Mifsud | 134/21 X |
| 5,454,136 | 10/1995 | Gougoulas | 15/319 |
| 5,524,329 | 6/1996 | Schmalzel | 15/312.1 |

*Primary Examiner*—Chris K. Moore
*Attorney, Agent, or Firm*—Dickstein Shapiro Morin & Oshinsky LLP

[57] ABSTRACT

A method and apparatus of removing dust deposited on a surface of a vehicle body using a dust-removing brush to release the dust from The surface of the body to remove through aspiration be suction air is disclosed. The method comprises the steps of:horizontally floating the brush with the brush being held in contact with the surface of the vehicle body to allow the dust to be released from the surface of the vehicle body; and flowing the suction air along the bristles from the end region to the root region thereof to effect to aspirate out the released dust as a result of the horizontal floating movement of the brush.

5 Claims, 5 Drawing Sheets

METHOD OF DUST REMOVING IN THE FORM OF AIR ASPIRATION AND APPARATUS THEREFOR

FIELD OF THE INVENTION

The present invention relates to a method and apparatus for performing air suction dust-removing, and more particularly a method and apparatus for removing waste thread and polishing powder deposited on the surface of a vehicle body.

BRIEF DESCRIPTION OF THE PRIOR ART

FIG. 7 shows the principal part of a conventional air-suction type dust-removing apparatus, in which a rotatable dust-removing brush 152 comprising a plurality of radially mounted goose feathers 153 around a shaft supported at both ends by the housing 107, not shown, is mounted in a housing 107 connected to the exhaust duct 129. In the housing 107, drive means such as a servomotor, not shown, rotates the dust-removing brush 152. The dust-removing brush 152 is arranged so as to engage the goose-feathers 153 with the surface of a vehicle body 109. The brush is rotated in the direction X to release the waste thread or dust to be air-suctioned through duct 129.

The dust-removing apparatus 102 is installed to a work cleaning apparatus capable of maintaining the clearance between the body 109 and dust-removing apparatus 2 in an optimal condition, with being vertically moved along the profile of the work such as a vehicle body 109.

In the conventional apparatus 102, the dust-removing brush 152 is rotated to remove the dust on the body 109, and the dust is likely to be strongly blown out and dispersed at a moment when the feathers 153 are not in contact with the surface. Also, a strong air stream is produced around the brush 152, causing floating dust transported by the air to be dispersed.

Accordingly, despite the air around the dust-removing brush 152 continuing to be suctioned through the duct, a suboptimal dust-removing effect is achieved, and the dust floating in the air is likely to deposited on the body 109.

An object of the invention is to properly suction the dust by releasing the dust from the surface of the work while preventing dispersion of the dust and also reducing the amount of the dust floating in the air to prevent redeposition thereof on the work surface.

SUMMARY OF THE INVENTION

The present invention relates to a method of dust-removing using a cleaning apparatus of the air aspiration, type and more particularly for releasing the dust including waste thread and polishing powder used for finishing after painting from the surface of a vehicle body, using a dust-removing brush, and aspiration of the dust by suction air, and an apparatus therefor.

Dust remaining on the surface of the work is allowed to be released from the surface when in contact with the surface, the released dust is properly suctioned in the housing, the dust is effectively prevented from being dispersed around the work and from floating in the air to increase dust-removing ability.

DETAILED DESCRIPTION OF THE INVENTION

Figure 1:
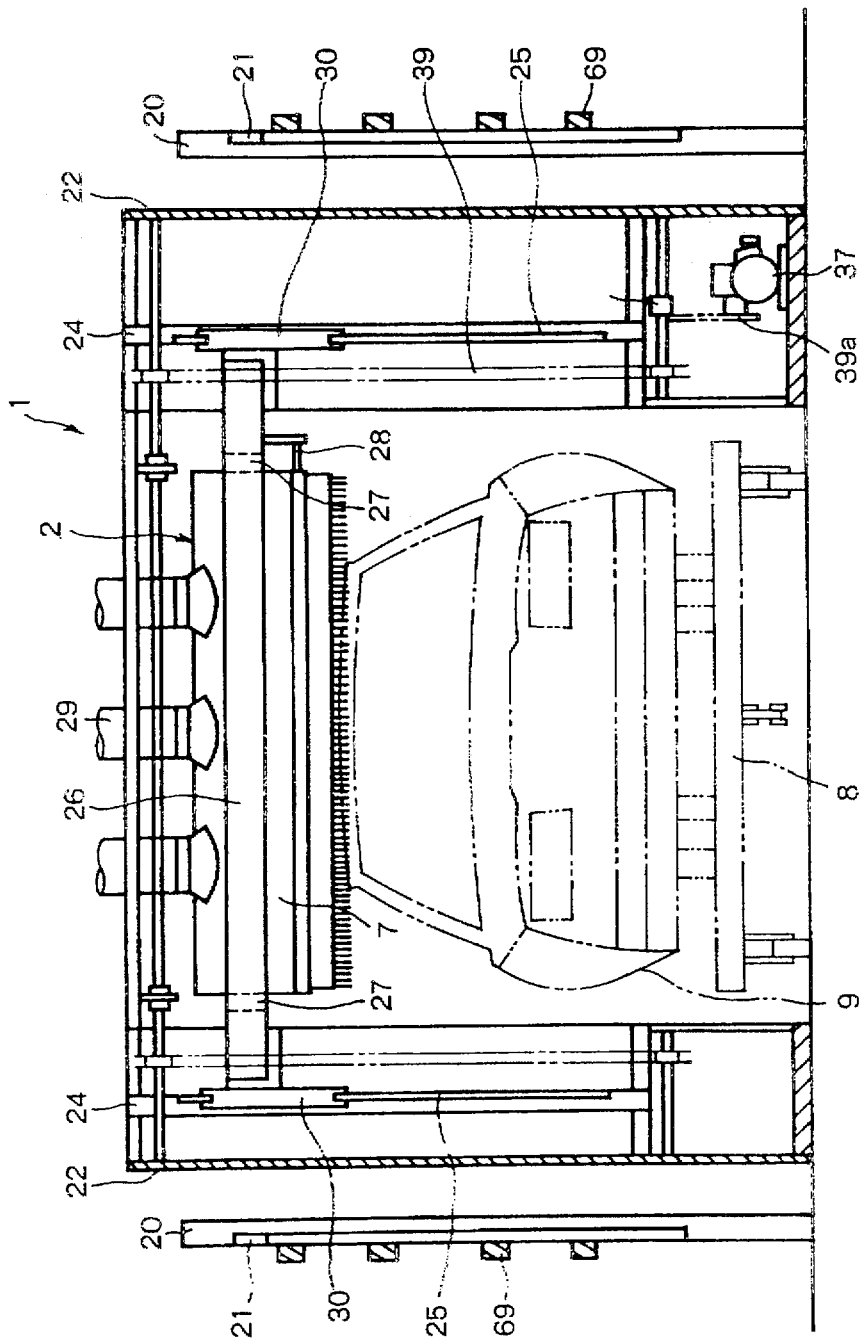
FIG. 1 is a front view of a work cleaning apparatus of the invention.

Referring now to FIG. 1, a work cleaning apparatus 1 reads out a profile of a vehicle body 9 conveyed by a conveyor 8 by means of a sensor to automatically control the height of a dust-removing apparatus 2.

In the construction of the apparatus 1, riding over the conveyor 8, between gate-like formed frames 22, a pair of support members 24 are disposed on the opposite sides of conveyor 8. On the opposite sides of the supports 24, a pair of guide rails 25 are mounted, along which the vertically movable slidable members 30 and a base plate 26 therebetween are provided. On the ends of the base plate 26, a pair of extending support arms 27 in the forward direction of the conveyor 8 and broader than the width of the body 9 are provided, and a dust-removing apparatus 2 is interposed.

In the downstream direction of conveyor 8, supports 20 and, sensor arrays 21 are provided. Beneath the work, a servomotor 37 is mounted to vertically actuate the slidable members 30.

The silhouette data produced by the sensors 21 are processed to produce a instruction signal, by which the clearance between the body and the brush is optimally maintained.

Figure 2:
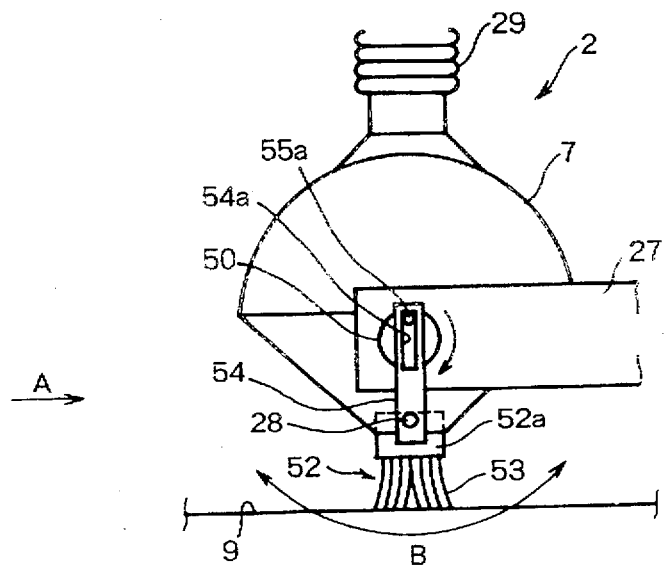
FIG. 2 is a side view of a dust-removing apparatus.
Figure 3:
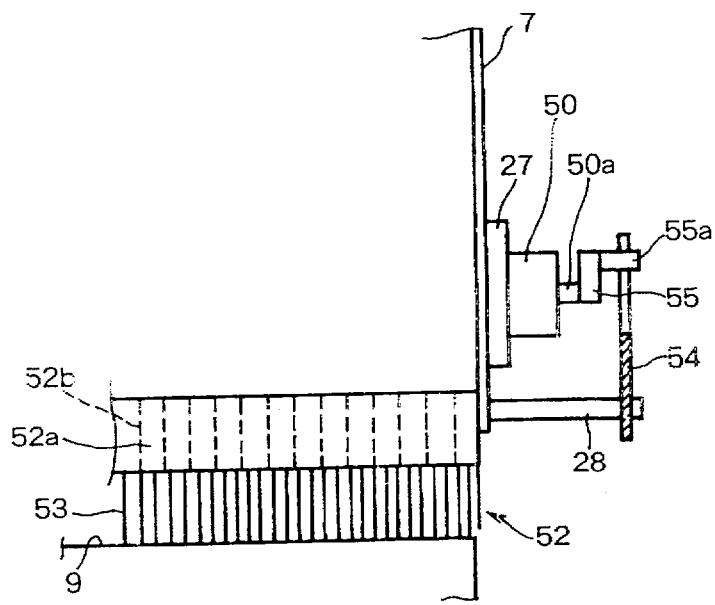
FIG. 3 is a fragmentary illustrative view

As in FIG. 2, housing 7 is formed as a funnel, which is supported at both ends by arms 27.

On one side of housing 7, an air motor 50 is mounted. Connected to the shaft 50a of the air motor 50 is a crank connecting member 55. On the other end thereof is a swing arm 54 with a long opening 54a, to which a pin 55a of the member 55 is swingably engaged.

A dust-removing brush 52 is mounted in the opening of housing 7. Brush 52 is formed of a body 52a and bristles 53, which are of non-conductive material such as horse-hair or carbon fiber formed with wound fibers. Air inlet openings 52b are formed, but these may be separately formed when enabled to introduce suction air.

Upon operation of the blower, the air in the housing 7 is exhausted through the duct 29 and absorbed from the end of bristles 53 to inlet openings 52b of the body 52a. By the suction air, the dust released from the surface of body 9 is introduced from inlet opening 52b into housing 7.

It is necessary that the suction air is provided with suction ability sufficient to absorb the released dust into housing 7. For example, to sufficiently collect the polishing powder or waste thread on the surface, an air flow having a flowing speed of 0.3 to 0.5 m/s must be maintained.

Also, for the suction air to flow through bristles 53 efficiently, the clearance formed between the main body 52a and the opening region of housing 7 should be as small as possible within the range not causing interference between the brush 52 and housing 7. Preferably the clearance is covered with a flexible sheet or the like.

The support shaft 28 extends from the both ends of main body 52a, one end of the shaft 28 is rotatably supported to housing 7 through a bearing, not shown, while the other end is secured to the other end of swing arm 54 outside the housing 7.

When the air motor is actuated, the pin 55a is rotated along an arcuate locus, the rotation is converted to a reciprocal motion of swing arm 54 forward and backward. This reciprocal motion in turn causes the dust-removing brush 52 to reciprocate around the axis of shaft 28. The swinging range of the brush 52 is such that the ends of bristles 53 always engage the surface of the body 9.

The air motor 50, connecting member 55 and swing arm 54 together are one example of a reciprocal motion causing arrangement. The invention is not limited thereto. Another example may be formed of a servomotor, a pinion and a threaded rack, which by repetition of reciprocating motion of the servomotor, causes swing motion of the swing arm and dust-removing brush 52. Also, another arrangement may be formed by a reciprocal motion of an air cylinder to cause the brush 52 to swing.

In operation, when a vehicle body 9 is conveyed along the conveyor 8, the sensor array 21 reads the profile of the body 9, and a controller (not shown) for the work cleaning apparatus 1 actuates the servomotor 37 to maintain the dust-removing apparatus 2 at the optimal height relative to the surface of the body for performing the dust-removing operation.

When the air motor 50 is actuated and the swing arm 54 reciprocates, the brush 52 reciprocate in the horizontal direction along the advancing direction of the body 9, where contact contact between the surfaces of the bristles 53 and body 9 is maintained, and, since the brush 52 is formed slightly broader than the width of body 9, a single motion of brush 52 allows for a cleaning motion over the entire width of body 9.

According to the movement of the body 9 by the conveyor 8, the bristles 53 of the brush 52 are moved in forward and backward directions with the dust on the body surface being continuously wiped away. At the time, since the suction air is continuously being introduced along the bristles 53 into housing 7, the released dust from the body surface is suctioned into housing 7 together with the air, and both flow through the exhaust duct 29 to be exhausted out of the cleaning apparatus.

As the bristles 53 are formed of a non-conductive material such as horse hair or carbon fiber, the generation of static electricity by friction with the body, the accumulation of dust by the generated static charge and dust deposition onto the body are all prevented.

Figure 4:
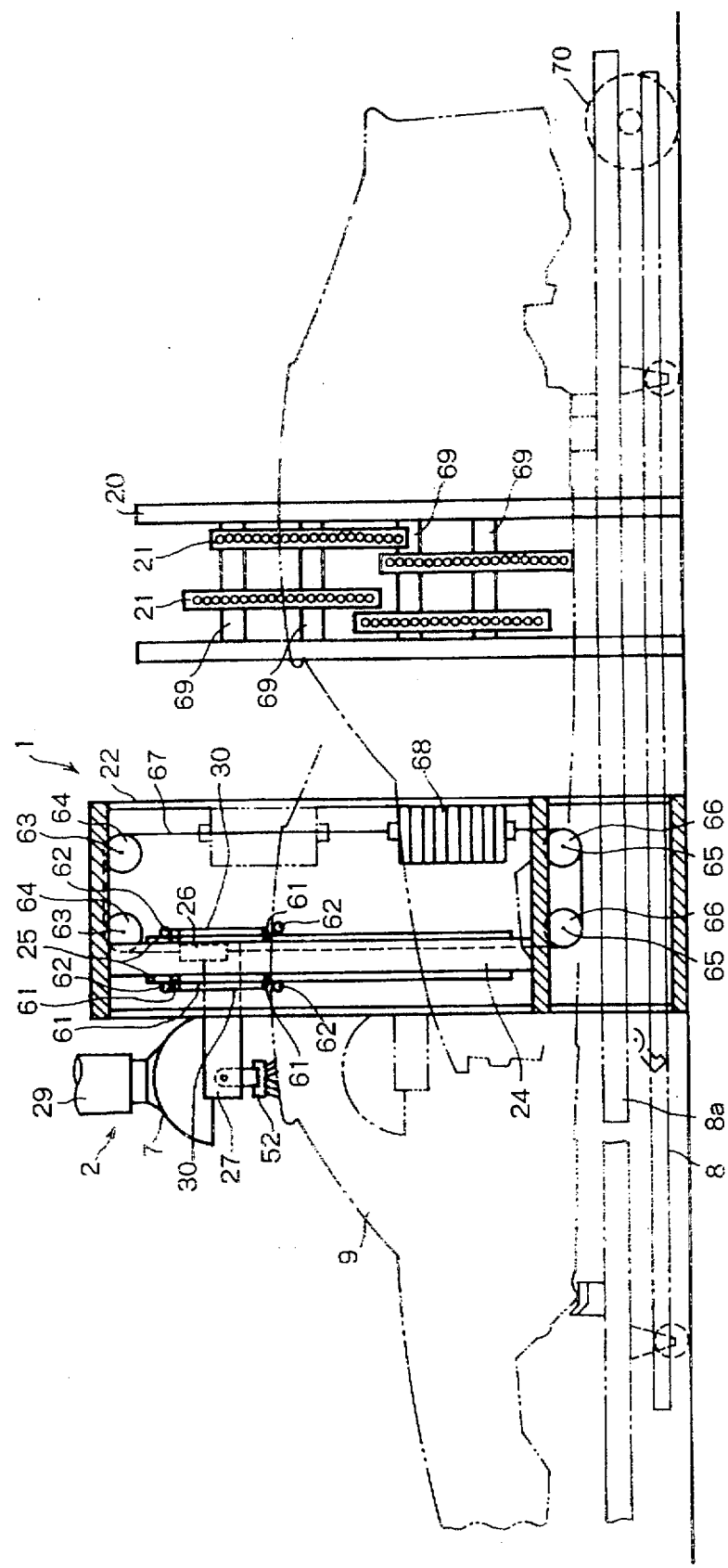
FIG. 4 is a front elevational view of a dust-removing brush.

Profiling the shape of body 9, the height of dust-removing apparatus 2 is controlled. The position control thereof is hereinafter described with reference to FIG. 4.

As previously stated, slidable members 30 are arranged to support guide rails 25 disposed on the opposed walls of the support 24 from outside the support 24. Provided on both ends of the slidable members 30 are rollers 61 rotatable around an axis in parallel with the axis of conveyor 8 and engaged with the external side surface of guide rails 25. On the other hand, other rollers 62 rotatable around an axis orthogonal to that of conveyor 8 are provided so as to engage with the opposite surface of the guide rails 25.

Bridged between the slidable members 30 is a base plate 26, on both ends of which a support arm 27 is mounted so as to extend in the downstream direction of the conveyer 8. Further on both ends of the arm 27, the housing 7 with dust-removing brush 52 is mounted. The slidable members 30, base plate 26 and support arm 27 are disposed for vertical movement as an integral member along guide rail 25. In addition, the brush 52 and body 9 are spaced apart from each other by a predetermined distance based on the support arm 27 as the standard member for positioning.

Rotatably supported on the top of the frame 22 are rotating shafts 63, adjacent the support member 24, on each of which shaft 63 is a pulley 64, which is supported on the side of conveyor 8. On each end of the vertical support of the frame 22, a rotating shaft 65 is mounted between the inner end outer walls in parallel with the shaft 63, and a pulley is provided opposed to each of the pulleys 64.

Supported around a pulley 64 and a pulley 66 is a belt 67, which has its end secured to the base plate 26. Further, the belt 67 has its other vertical branch mounted to a balance weight 68 for providing a smooth vertical motion of support arm 27.

Arranged beneath the shaft 65 is a servomotor, which has its drive shaft secured to a chain-sprocket 39a. Another chain-sprocket 39b is secured on the shaft 65 in a position to be coupled to the first sprocket 39a, both of which are operatively coupled by a chain bridged therearound. The rotating power of servomotor 37 is transmitted to shaft 65 via the chain, and further, via another belt 67, to the upper rotating shaft 63, thereby causing vertical movement of slidable members 30.

In the position downstream the cleaning apparatus 1 with respect to forward direction of conveyor 8, a plurality of horizontal members 69 are mounted on the support 20 formed in the shape of a ladder on both sides of conveyor 8. On the opposite surfaces of the support 20, sensor arrays 21 are mounted spaced apart from each other other and having a pitch of 20 mm.

A drive motor 70, whose rotating speed can be set in accordance with the moving speed of the conveyor 8 such that one pulse is generated every time the conveyor 8 moves for 20 mm, is equipped with a rotary encoder 71 which serves as means for generating signals with a predetermined time interval.

Figure 5:
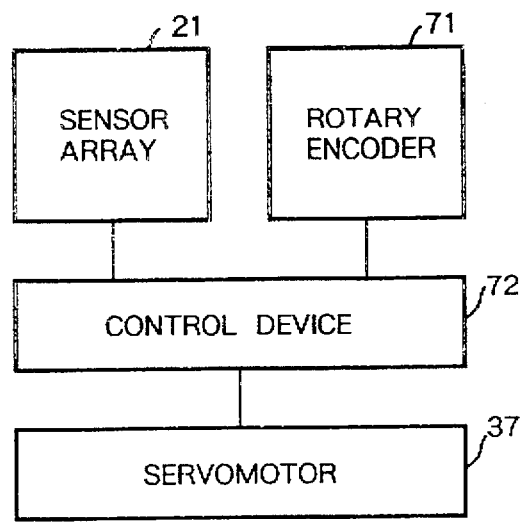
FIG. 5 is a block diagram of a control circuit.
Figure 6:
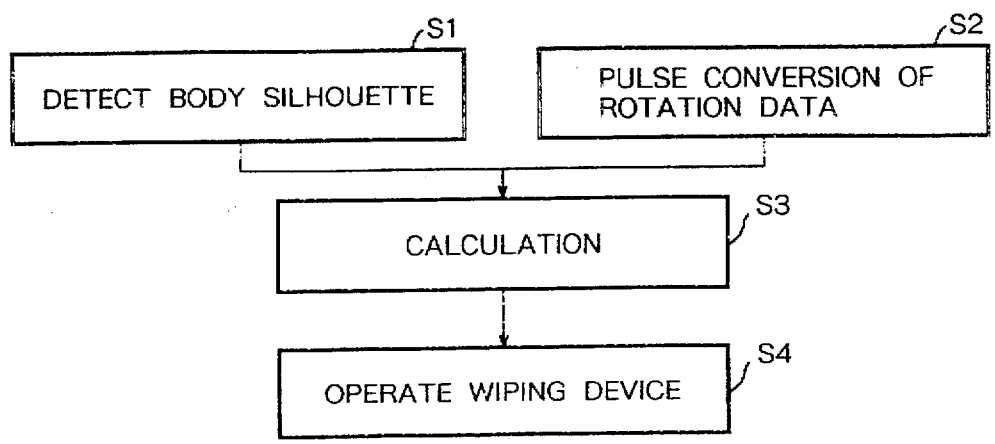
FIG. 6 is a flow chart illustrating the control flow of the invention.
Figure 7:
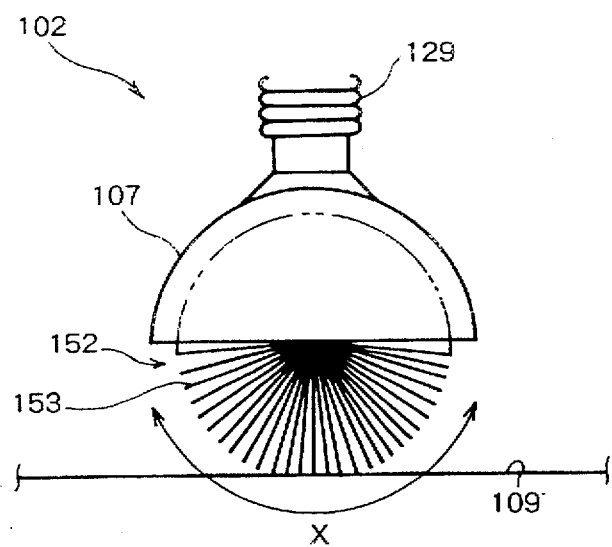
FIG. 7 is a fragmentary side view of an example of a conventional.

FIG. 5 is a schematic view of a control device for the position control means provided with the aforementioned rotary encoder, and FIG. 6 is a flow chart showing the flow of such control operation.

The data transmitted from a rotary encoder 71 and the silhouette data of the body 9 from sensor arrays 21 are applied to a control device 22 and processed therein to control the operation of servomotor 37 provided in the work cleaning apparatus 1.

In the step S1, when a vehicle body 9, which is placed on a carrier 8a of conveyor 8, approaches from the side of cleaning apparatus 1, the silhouette or profile of the body 9, which namely represents the shape ranging from the bonnet or hood through the roof or gate to the trunk lid, is detected by means of sensor arrays 21 each arranged along a support 20.

Also, the data therefrom are applied to the control device 72. In step S2, the silhouette data of the vehicle body detected by the arrangement of the sensor arrays 21 and digital data representing the moving velocity of conveyor 8 are transmitted and applied to a control device 72. In such a manner, the velocity of conveyor 8 is converted to digital data by the rotary encoder 71, which is applied to the control device 72.

In the step S3, on the basis of the data of the body silhoutte and of moving velocity of the conveyor 8, the direction and velocity to be provided for the servomotor 37 is determined. Then, in the step S4, the servomotor 37 is controlled so as to move the slidable members 30 in the vertical direction in accordance with the body silhouette to cause the vertical movement of the brush 52 to continuously maintain a clearance between the body 9 and brush 52 as optimal for performing dust-removing operation.

In this embodiment, the present invention is particularly effective when installed in a coating line in the automobile industry. In the first step of undercoating an automobile body prior to electrodeposition coating, the body surface is polished. The process of removing the polishing powder and powder dust cannot be removed by the usual method using water. The present invention can be effectively applied.

Although the invention is described by an embodiment for cleaning a vehicle body, it also can be applied to cleaning other works or objects.

What is claimed is:

1. A method of removing dust deposited on a surface of a vehicle body using a dust-removing brush and aspiration of air, said method comprising the steps of:

reciprocating said brush with said brush being held in contact with the surface of said vehicle body to allow the dust to be released from the surface of said vehicle body; and aspirating said air along the bristles of said brush, from the end region to the root region of said bristles, to aspirate out the dust released as a result of said reciprocating movement of said brush.

2. An air suction type dust-removing apparatus for removing dust from a work, comprising:

a housing in communication with an exhaust duct for allowing suction air to flow;

a dust-removing brush located at an opening of said housing;

a device for causing reciprocating motion of said brush; and said brush including a main body and electrically non-conductive bristle members, said main body being supported by said housing and having a plurality of air inlets therethrough, and said bristle members being provided adjacent said air inlets.

3. A dust-removing apparatus according to claim 2, further comprising:

a conveyor for conveying the work past the brush;

a sensor for detecting profile data of said work;

signal generating means for generating signals with a predetermined time interval in accordance with the velocity of the conveyor; and control means for controlling a servomotor to cause vertical movement of said dust-removing brush.

4. A dust-removing apparatus according to claim 2, wherein said work is a vehicle body.

5. A dust-removing apparatus according to claim 3, wherein said work is a vehicle body.

* * * * *